United States Patent Office 2,897,887
Patented Aug. 4, 1959

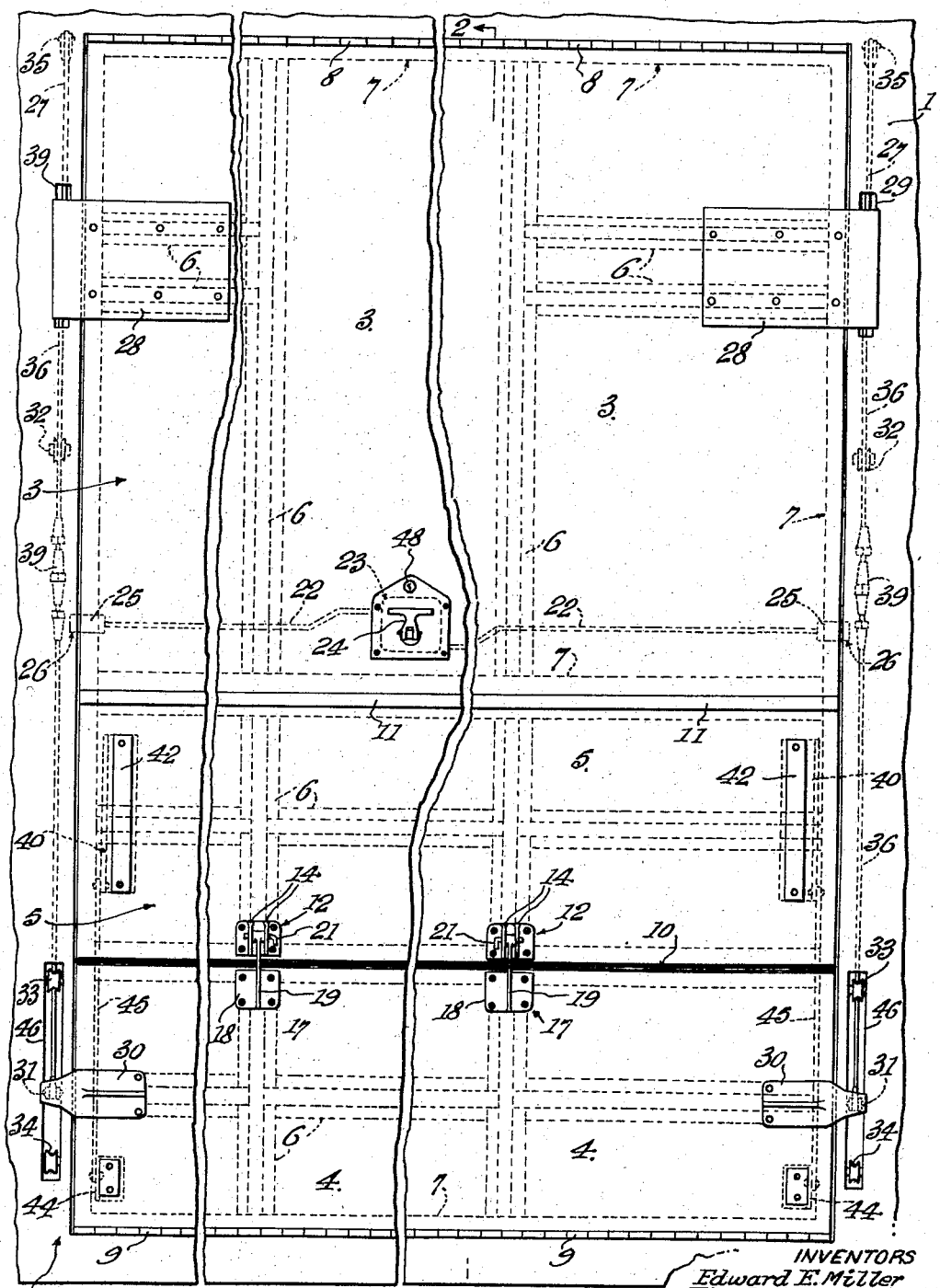

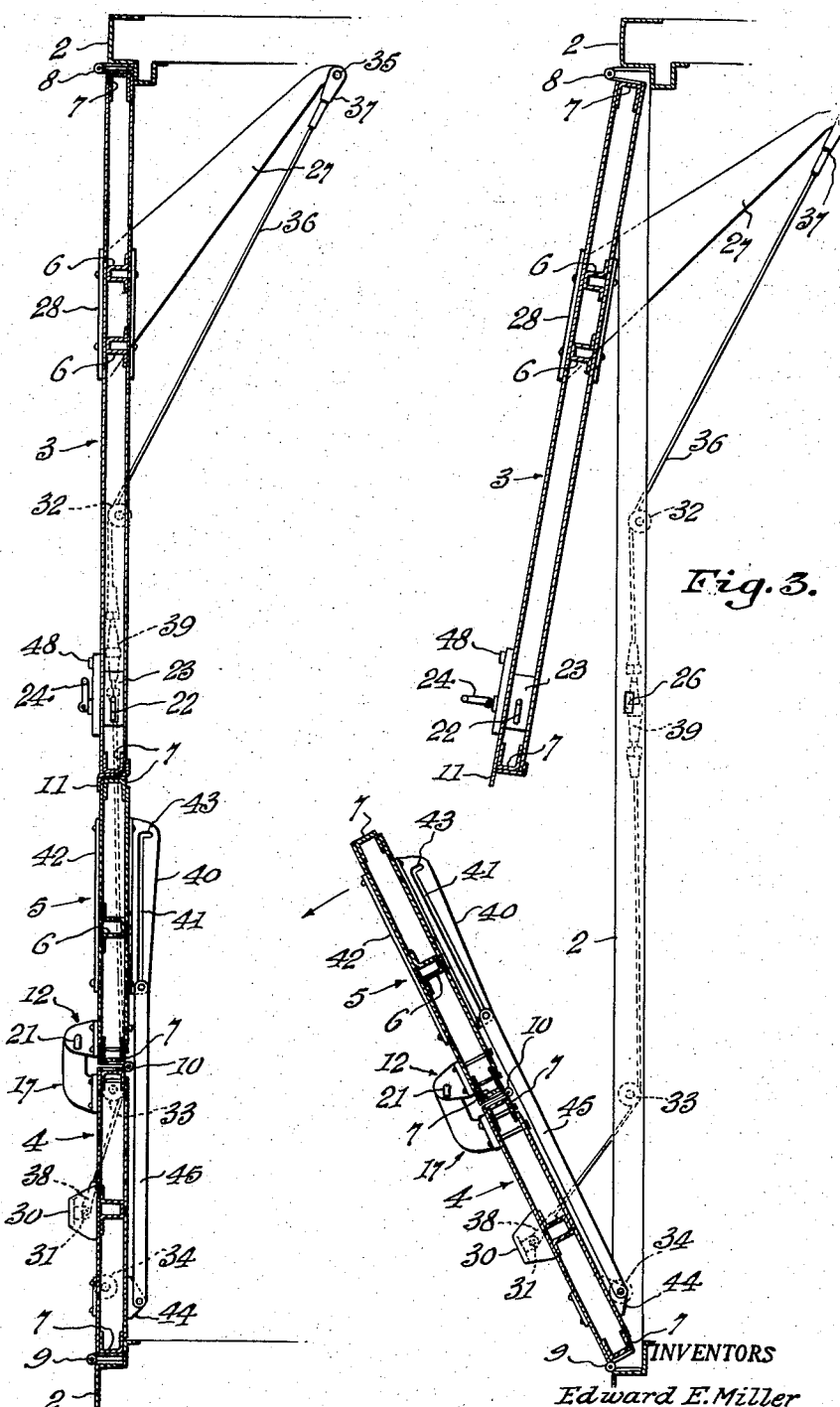

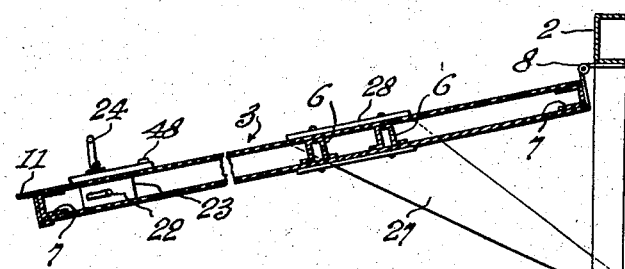

2,897,887

MANUALLY OPERATED FOLDING PANEL

Edward E. Miller, Alexandria, Va., and Finch Stowell, Elmhurst, Ill.

Application February 26, 1958, Serial No. 717,792

4 Claims. (Cl. 160—97)

(Granted under Title 35, U.S. Code (1952), sec. 266)

The invention herein described may be manufactured and used by or for the Government for governmental purposes without the payment of any royalty thereon.

This invention relates to closure means for providing access to the interiors of buildings, vehicles, etc. More particularly, the invention provides counterweighted folding panel means for facilitating the loading and unloading of buildings or vehicles having raised floors.

Conventional enclosed truck bodies are closed at the loading end by a pair of vertically hung, outwardly opening doors having many disadvantages. In preparing to load or unload such a truck, it is necessary to take into account and allow for the space needed to swing the doors open. Furthermore, when the truck is being backed up to a loading dock, these doors extend into the loading area thereby restricting movement on the dock. When loading or unloading occurs away from a platform of the proper height, it is necessary to climb on and off the elevated floor of the truck with the cargo, endangering both cargo and men. Moreover, no protection from the elements is afforded and the cargo may be damaged by rain or snow.

Loading doors now provided in buildings, such as warehouses, also have disadvantages. Present day structures use vertically hung panels or, more frequently, are of the roll-up type. The former have the disadvantage of requiring a relatively large area to permit them to be opened and closed, while the latter require fairly elaborate and expensive spring and track mechanisms. Also, for closing large doorways, the latter type may require motor drive means to open and close the heavy panels. As in the case of conventional truck doors, existing warehouse doors do not provide awning or step means.

The present invention does away with the difficulties encountered with conventional doors. By using horizontally hinged panels, the doors do not extend into the loading area when open. Moreover, the upper and lower panels of this invention provide awning and step means providing easy, sheltered access to the interior of the truck or building. A novel lever and cable arrangement permits one man to easily open the counterweighted panels. When in closed position, this novel panel structure occupies substantially no more space than required for its own thickness.

Accordingly, an object of the present invention is to provide a closure means for a building or truck body which may be easily opened and shut by one man without the aid of cranks, motors, or the like.

A further object of the invention is to provide a closure of the type described which in its opened position, provides an awning over the opening and steps between ground level and the floor of the structure, and which does not interfere with mobility or obstruct passageways when in its closed position.

Still another object of the invention is to provide a novel mechanical linkage for a folding door consisting of horizontally hinged panels, whereby a minimum of effort is required to completely open or close the door.

A still further object of this invention is to provide a closure of the type described which occupies a minimum of space in both its open and closed positions.

Briefly stated, the instant invention comprises an upper panel hinged to the top of the opening and a two-section lower panel hinged at the bottom. The panels are interconnected by a mechanical linkage consisting of lever members attached to both ends of the upper or awning panel and cables of suitable length attached to the ends of the levers and to the lower section of the bottom or step panel over a series of pulleys, whereby opening or closing of either panel causes similar movement of the other panel. By counterweighting one panel with the other, a minimum of effort is required to open and close the panels. The lower, or step-panel, is hinged at its center and is provided with a guide bar linkage which produces a ninety degree angle between the hinged sections of the lower panel, forming a step when the panel is lowered. If desired, the lower section may be opened without forming the step.

The operation and advantages of this invention will be better understood from the following detailed description thereof when read in conjunction with the accompanying drawings in which—

Fig. 1 is an elevation of the door structure viewed from the outside of the building or vehicle;

Fig. 2 is a cross-section taken along the line 2—2 of Fig. 1 with the door in fully closed position;

Fig. 3 is a cross-section taken along line 2—2 of Fig. 1 when the door is partially open;

Fig. 4 is a cross-section taken along line 2—2 of Fig. 1 when the door is in its fully open position;

Fig. 5 is a cross-section taken along line 2—2 of Fig. 1 of the lower portion of the door when used as a step, and Fig. 6 is a detail of the bracket and pin structure joining the two sections of the step-forming panel.

In Fig. 1 of the drawings, 1 denotes the enclosing structure in which the novel closure is used. This may be a building wall or a truck body. In either case, the opening would be framed at top, bottom, and sides, for example with hollow members 2 (Figs. 2, 3, 4) shaped to snugly receive the door panels. These hollow members may be of metal or other suitable material.

Panels 3, 4, and 5 may be made of any suitable material. In a preferable embodiment, these panels are made up of sheets of lightweight metal such as aluminum, on a frame of flanged channel members 6, also of aluminum. The edges of the panels are sealed by channel members 7 of the same material. The sheets are fastened to the flanged members and channels such as by riveting or welding to form strong, lightweight rigid panels.

Panel 3 is mounted on member 2 forming the top of the opening, by means of hinge 8, preferably of the continuous or piano type, although any suitable hinge may be used. A piano hinge is preferred, however, since in addition to providing a snug pivot without longitudinal play, it effectively seals the space between the frame member 2 and panel 3 against dirt, moisture, etc. Panel 4 is similarly mounted on the member 2 forming the bottom of the opening, by hinge 9. As is apparent from Figs. 2 and 3, hinges 8 and 9 are mounted with their pivot portions exterior of the door structure to permit the panels to be opened outwardly.

Panel 5 is connected to panel 4 by means of another continuous or piano type hinge 10, similar to elements 8 and 9. Hinge 10, however, is arranged with its pivot portion interior of the door structure to permit displacement between panels 4 and 5 opposite in sense to that between panel 4 and the structure 1. Fastened along the lower edge of panel 3 is an angle member 11, so disposed as to form a weather seal over the small gap appearing between panels 3 and 5 when in their fully closed position.

Panels 4 and 5 are normally held in coplanar alignment by the quick-releasable locking means shown in Fig. 6. Fastened to panel 5 are bracket members 12, two of which are shown in Fig. 1 although more may be used, if desired. Bracket 12 comprises a base portion 13, engaging the surface of panel 5, and a pair of arms 14 extending outwardly perpendicular to the base 13. Each of the arms 14 is provided with a hole 15. In the embodiment shown, bolts 16 hold bracket 12 to panel 5, although welding or other suitable means may be used, if desired.

Aligned with each bracket 12 and similarly fastened by bolts 47 to panel 4 is a complemenetary bracket member 17, comprising base portion 18 and ear portion 19. The latter is disposed perpendicularly to the base 18 and extends outwardly therefrom. The end of ear 19 is slightly thickened and is provided with a hole 20. When panels 4 and 5 are fully opened to form a single plane surface, ear 19 engages the arms 14 of bracket 12 with the respective holes 20 and 15 in alignment. Pins 21 are inserted through these holes to lock the brackets, and thus the panels, in their aligned relationship. When it is desired to provide relative movement between panels 4 and 5, pins 21 are slipped out and the panels are unlocked.

To keep the entire panel structure securely closed, locking means are provided. A simple type is shown in Fig. 1, although any desired arrangement may be used. Horizontal arms 22 mounted interiorly of panel 3 are pivotally connected to an eccentric plate (not shown) in housing 23. Handle 24 is provided for manually rotating the eccentric plate, whereby arms 22 are simultaneously extended from or retracted into panel 3, depending on the direction of rotation. Arms 22 are terminated by bolts 25 which when in locked position engage openings 26 provided in the hollow members forming the sides of the opening. Handle 24 may be folded flat against the surface of panel 3 when not in use. To prevent unauthorized entry, key operated means 48 may be provided in housing 23.

As can be seen, with panels 4 and 5 locked by pins 21 and arms 22 fully extended, panels 3, 4, and 5 form a snugly fitting closure in the structure 1.

Mounted on panel 3 are a pair of lever members 27. These members, mounted one at each edge of panel 3, are preferably made integral with mounting plates 28 which are securely fastened to the panel. As shown in Fig. 1, additional angle members 6 are provided within panel 3 to provide a solid foundation to which the plates 28 may be fastened. Bolts, rivets, or welds may be used.

Plates 28 extend beyond their respective edges of panel 3 to overlap the members forming the vertical sides of the opening in the structure. As shown best in Figs. 2-4, lever members 27 are formed or mounted at the outermost ends of plates 28 and lie in a plane perpendicular thereto. Each of the lever members is substantially triangular in shape, and with panel 3 in its fully closed position, extends upwardly from the panel and into the interior of the structure. Slots 29 (Fig. 1) are provided in the frame to provide access for levers 27. The uppermost vertex of each lever is provided with a pivot or connecting pin 35.

Along the edges of panel 4 are mounted a pair of brackets 30, which similarly to plates 28, extend beyond the panel and overlap the frame members. Each of the brackets 30 comprises a bent-up portion extending beyond the panel and supporting a connecting pin or pivot 31.

Mounted within each of the hollow frame members forming the respective sides of the opening are three pivot or fulcrum elements, 32, 33, 34. These elements conveniently are pulleys journaled in any well known manner in the frame members and disposed as shown in Figs. 1-4. The function of these elements will be more fully discussed hereinafter.

Flexible members 36, which are preferably made of steel or aluminum cable to provide high tensile strength, are provided with eye portions 37, 38, at the upper and lower ends thereof, respectively. These eye portions are respectively connected to pins 35 on levers 27 and pins 31 on brackets 30. The cables or ropes 36 are provided with length adjusting means 39, such as turnbuckles, whereby the cable length and tension may be varied. Each of members 36 extends from pin 35 on lever 27, over the outwardly disposed side of pulley 32, around the inwardly disposed side of pulley 33, and to pin 31 on bracket 30. Slots 46 are provided in the side frame members to permit the cables 36 to be connected to pins 31. Pins 35 and 31 and pulleys 32, 33, 34 are aligned substantially in the same plane for maximum efficiency, although the invention will operate satisfactorily if this alignment is somewhat varied. With the panels in fully closed position (Fig. 2), cables 36 are adjusted by means of turnbuckles 39, to remove all slack. As is apparent from the drawings, the cable, pulley, and levers are located substantially entirely within the frame members of the structure and do not occupy space within the storage area nor obstruct movement therein.

When opening the panels, the locking bolts 25 are retracted by manual rotation of handle 24. Panel 3 is then pulled outward slightly by a force exerted on handle 24. When panel 3 has been opened sufficiently to permit panel 5 to clear angle member 11, which has been found to be a matter of inches, the operator will release handle 24 and bear down on the now exposed upper edge of panel 5, pulling outwardly and downwardly as shown in Fig. 3. As can be seen from Fig. 3, as panels 4 and 5, and consequently pins 31, move down and away from the structure, this motion is transmitted through the cables 36 over pulleys or fulcrums 32 and 33 to the pins 35 at the ends of levers 27. The downward forces thus exerted on levers 27 cause panel 3 to pivot about hinge 8 and open.

As was stated hereinbefore, this invention is notable principally for its ease in opening and closing. This ease is achieved through the novel lever and pulley structure described above. In the arrangement disclosed, each of the levers 27 functions to provide a large mechanical advantage whereby the tensile force applied manually to cable 36 is several times multiplied. Therefore, a small force manually applied to the upper edge of panel 5 will provide the relatively large force needed to lift panel 3. Furthermore, as panels 4 and 5 descend, the pull of gravity is added to the manual force to lower these panels. Once a certain point is reached, the pull of gravity on the panels 4 and 5, transmitted through cable 36 and multiplied by the mechanical advantage available at lever 27, becomes sufficient of itself to lift the upper door panel to its open position. The upper and lower sections of the closure are thus counterweighted and require manual effort only in starting their actuation.

In Fig. 4, the panels are shown in their fully open position. Panel 4 is hanging vertically downward from its hinge 9 and the tension thus exerted on cable 36 keeps panel 3 in its near horizontal position. Pulley 34, heretofore unused, now acts as a tensioning element and keeps the cable in its proper alignment. Panel 3 provides a rain or snow shield over the opening in this position.

Panels 4 and 5 are hinged at 10 to permit relative angular displacement. Referring to Fig. 5, these panels are shown disposed at right angles to each other with the entire door structure in its fully open position. These panels thus form a step for easy access to the floor of the structure. Fixed near each edge of panel 5 and parallel to it is an angle plate 40 having a slot 41 therein. Each angle plate 40 is fastened to the inner face of panel 5 by bolts or rivets anchored in plate 42 arranged to overlay a flanged channel member 6 to provide the necessary rigidity. Slot 41 is formed with a small detent portion 43 at right angles to the main portion.

Fixed at each edge of panel 4, in substantial alignment with angle plates 40 are brackets 44. Pivotally connected at one end to each of the brackets 44 is a guide bar 45, the other end of which carries a pin slidably carried in slot 41 of the angle plate 40. As shown in Fig. 5, with pins 21 removed from locking means 12 and 27, and the panels in their fully opened position, panel 5 is folded up with respect to panel 4 until guide bar 45 engages the detent portion of the slot 41. Panels 4 and 5 are thus fixed with respect to each other to form a convenient step by means of which the structure may be entered.

Should it be desired not to use the step portion of the invention during a given loading or unloading operation, such as when a loading platform is available, pins 21 are left in and panels 4 and 5 opened to form a single panel hanging vertically downward.

To disengage the step portion when preparing the panels for closing, panel 5 is lifted slightly until guide bar 45 disengages the detent portion 43 of slot 41. Panel 5 is then lowered until holes 15 in brackets 17 and holes 20 in brackets 12 are in alignment. Pins 21 are then inserted to lock the panels in their coplanar relationship.

The counterweighted feature of the upper and lower panel sections is also brought into use during the closing operation. As the lower panels are lifted, gravitational force tending to pull upper panel 3 downward is transmitted through the cable 36 to assist in raising the lower panels. Thus a minimum of effort is required to close the panels. When all panels are in their fully closed position, handle 24 is actuated to lock them in place.

The invention having been described in what is considered to be a preferred embodiment thereof, it is to be understood that the specific details shown are merely illustrative and that various modifications and changes may be made without departing from its spirit and scope, with only such limitations placed thereon as may be imposed by the prior art.

We claim:

1. In combination with an enclosing structure having an opening therein, closure means for said opening comprising a first panel hingedly mounted on said structure adjacent to the top of said opening, a second panel hingedly mounted on said structure adjacent to the bottom of said opening, a lever member attached to said first panel extending into the enclosing structure, a plurality of fulcrum members disposed adjacent to the edges of said panels and substantially aligned with the planes thereof when the panels are in the closed position, a flexible element connected to said lever arm and to said second panel and in contact with said fulcrum members whereby movement of one panel causes simultaneous movement of the other panel, said first and second panels being continuously counterbalanced during movement between closed and open position.

2. In combination with an enclosing structure having an opening therein, a frame defining said opening, closure means for said opening comprising a first panel hingedly mounted on said frame adjacent to the top of said opening, a second panel hingedly mounted on said frame adjacent to the bottom of said opening, a lever member attached to said first panel extending into the enclosing structure to a point substantially horizontally opposed to the first panel hinge, a plurality of fulcrum members disposed adjacent the edges of said panels and substantially aligned with the planes thereof when the panels are in the closed position, a flexible element connected to said lever arm and to said second panel and in contact with said fulcrum members whereby movement of one panel causes simultaneous movement of the other panel, said flexible element being of a length which will hold the first panel in a substantially horizontal position when the second panel is in substantially a vertically depending position, said first and second panels being continuously counterbalanced one by the other during movement between closed and open positions.

3. In combination with an enclosing structure having an opening therein, a frame defining said opening having hollow, substantially vertically disposed members, closure means for said opening comprising a first panel hingedly mounted on said frame adjacent to the top of said opening, a second panel hingedly mounted on said frame adjacent to the bottom of said opening, a lever member attached to said first panel extending into said enclosing structure to a point opposite the hinged edge and substantially normal to the plane of said first panel, a plurality of fulcrum members journaled within a hollow frame member, a flexible element connected to said lever arm and to said second panel and in contact with said fulcrum members whereby movement of one panel causes simultaneous movement of the other panel, said flexible element being of a length which will hold the first panel in a substantially horizontal position when the second panel is in substantially a vertically depending position, said first and second panels being continuously counterbalanced one by the other during movement between closed and open positions.

4. In combination with an enclosing structure having an opening therein, closure means as set out in claim 3 wherein said second panel is comprised of two subpanels hingedly connected at the adjacent edges thereof, and locking means for holding said subpanels in a plurality of fixed positions with respect to each other.

References Cited in the file of this patent

UNITED STATES PATENTS

| | | |
|---|---|---|
| 688,448 | Thompson | Dec. 10, 1901 |
| 1,794,938 | Wunderlich | Mar. 3, 1931 |
| 2,152,713 | Stewart | Apr. 4, 1939 |
| 2,481,230 | MacDonald | Sept. 6, 1949 |